UNITED STATES PATENT OFFICE.

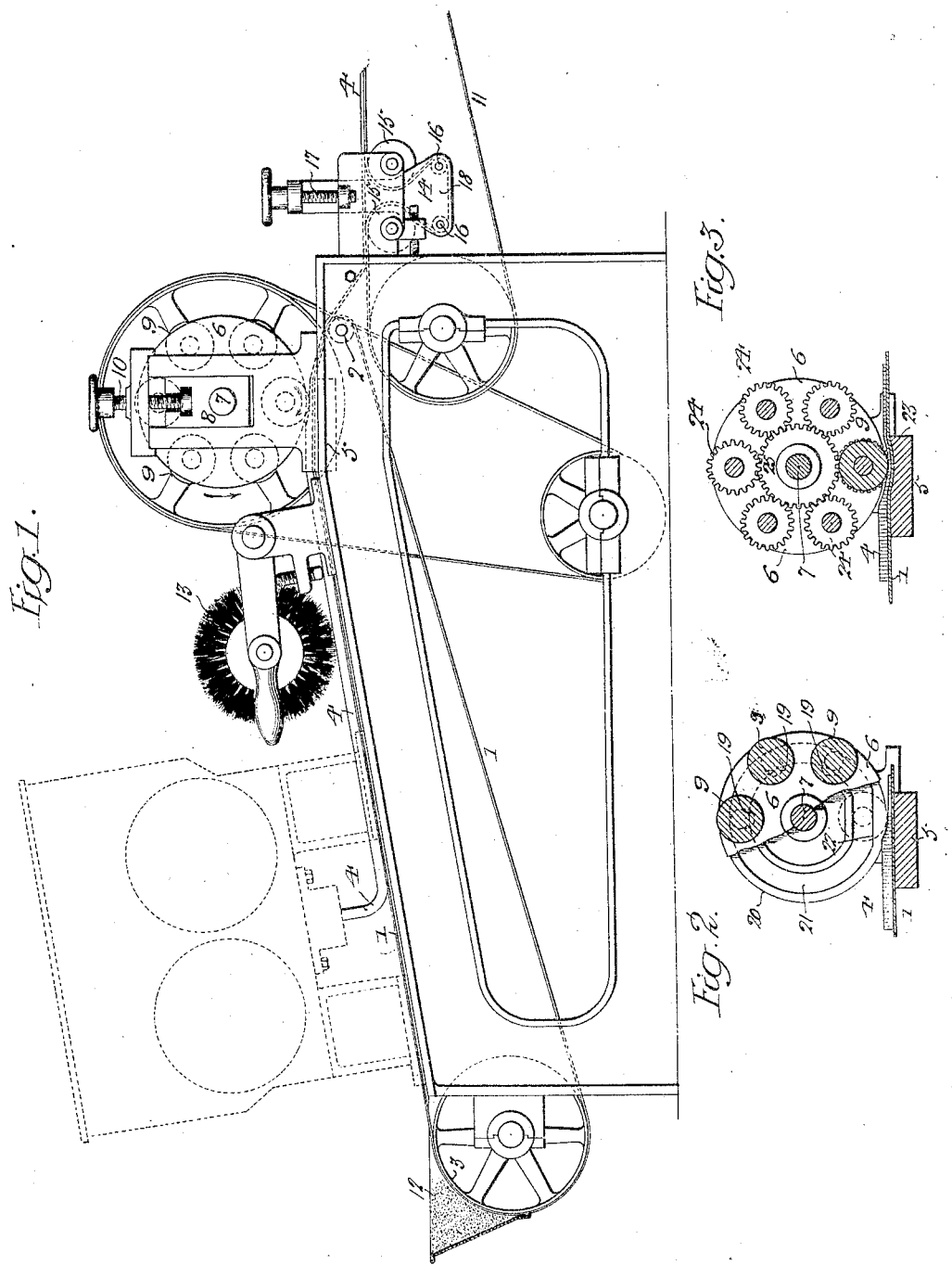

PEMBROKE D. HARTON, OF PHILADELPHIA, PENNSYLVANIA.

DOUGH APPARATUS.

No. 829,270.          Specification of Letters Patent.          Patented Aug. 21, 1906.

Application filed April 6, 1905. Serial No. 254,185.

*To all whom it may concern:*

Be it known that I, PEMBROKE D. HARTON, a citizen of the United States, residing in Philadelphia, Pennsylvania, have invented certain Improvements in Dough Apparatus, of which the following is a specification.

My invention relates to machinery for working dough; and it consists of a special form of apparatus designed to reduce the thickness of sheets of dough and at the same time polish the surface of the same and feed it to a point where it may be passed to any suitable form of biscuit-cutting machine. The dough previously prepared may be fed to my improved machine in any suitable manner, although I prefer that it shall be in sheet form, continuous or otherwise, and of such thickness and consistency that it may be readily reduced to the desired thinness by the structure forming the subject of my invention.

My invention is fully shown in the accompanying drawings, in which—

Figure 1 is a side elevation of the machine or apparatus embodying my invention, and Figs. 2 and 3 are sectional views illustrating modifications of my invention.

In the drawings herewith, 1 represents an endless carrying-belt driven in any suitable manner and passing over guide-rolls 2 and 3, to either or both of which the driving force may be applied in any suitable manner. This belt receives the dough 4, which may be discharged thereon from a suitable apparatus, such as that indicated by dotted lines, or it may be fed from any other machine or in any other way suitable or desirable for further treatment by the apparatus I have devised, although I prefer to receive it in sheets, which may be continuous or otherwise.

The belt 1 passes over an anvil 5, supported by the frame of the machine, and disposed above this anvil are a pair of heads 6, carried by a suitable shaft 7, which is journaled in adjustable bearings 8. These heads carry a series of independently-revoluble rolls 9, which may be loosely journaled therein and free to turn on their own axis independently of the heads as the latter are rotated, as shown in Fig. 1. The journals 8 may be adjusted by screws 10, and thereby regulate the thickness of the sheet of dough passed from the said rolls. This structure is driven at a high rate of speed by any suitable means, and the dough fed to it receives a rapid hammering that reduces its thickness to that desirable for forming crackers or biscuits or other similar articles of food and at the same time imparts a much desired polish, which is retained by the dough during the baking operation. The dough then passes to another belt 11, and thence it may be fed to a biscuit-cutting machine of any desired type.

At the rear of the main belt 1 I mount a receptacle 12 for flour, which will automatically coat said belt as the latter moves, and thus prevent the dough sticking, and I provide an adjustable brush 13, which will spread the flour on the upper surface of the dough and distribute it evenly thereon. The belt 11 is also provided with flouring means consisting of a chamber 14 to receive the flour, which chamber is formed by guiding said belt over a series of rolls 15 and 16, the upper rolls being placed as close together as possible, so that the gap is too small to damage in any way the sheet of dough. This belt travels at a much higher rate of speed than the belt 1, as the thinner sheet of dough will be discharged very rapidly from the reducing-rolls, and said belt 11 may have its slack taken up or reduced by the screws 17, which are connected to the frames 18, supporting the lower rolls 16.

In Fig. 2 I show a modification of my invention in which the loose rolls 9 are provided with slotted seats 19 in the heads 6, and fixed disks 20, each having a guiding-groove 21, are disposed beyond the ends of such rolls 9 and in position to receive the ends of their spindles, so that said rolls may be guided by a flat or cam portion 22 and effect a positive horizontal movement of the lowermost roll as the head carrying the same is rotated. By this means any tendency of the dough to assume a fluted or corrugated condition, due to the blows struck by the small rolls carried by the rotating heads, will be overcome. Another means of effecting this result consists in hollowing the anvil 5 at the point of contact by the rolls 9, as shown at 23 in Fig. 3.

Instead of having the rolls 9 rotating loosely in their bearings in the disks 6 they may be provided with pinions 24, meshing with a gear-wheel 25, as shown in Fig. 3, such wheel being driven in the same direction as the heads, but at a greater speed.

Having thus described my invention, I claim and desire to secure by Letters Patent—

1. The combination in a dough-treating machine, of means for supporting the dough, a rotating member, and a series of independently-rotatable elements carried by said member for subjecting said dough to a series of blows imparted in rapid succession.

2. The combination in a dough-treating machine, of means for supporting a sheet of dough, means for feeding said sheet, a rotating member, and a series of independently-rotatable elements carried by said member for subjecting said dough to a series of blows imparted in rapid succession.

3. The combination in a dough-treating machine, of means for supporting the dough, and means for subjecting said dough to blows from a series of rotatable members bodily movable around a common center, for the purpose of flattening said dough.

4. The combination in a dough-treating machine, of means for supporting the dough, means for subjecting said dough to blows from a series of rotatable members bodily movable around a common center, for the purpose of flattening said dough, and means for rotating said members.

5. The combination in a dough-treating machine, of means for supporting the dough, rotatable members bodily movable around a common center for subjecting said dough to a series of blows to flatten the same, a gear-wheel concentrically disposed with respect to said center, and pinions carried by said rotatable members in mesh with said gear-wheel whereby said members may be rotated during their movement around the common center.

6. The combination in a machine for treating dough, of means for supporting and feeding the dough, and a series of independently-revoluble members bodily movable around a common center for imparting a series of blows to said dough.

7. The combination in a machine for treating dough, of means for supporting and feeding the dough, a rotating head, and a series of independently-revoluble members carried by said head for imparting a series of blows to said dough.

8. The combination in a machine for treating dough, of means for supporting and feeding the dough, an anvil or bed over which the dough is fed, a rotating head, and a series of independently-revoluble rollers carried by said head and adapted to act on the dough and flatten it against said anvil.

9. The combination in a machine for treating dough, of means for supporting and feeding the dough, an anvil or bed over which the dough is fed, a rotating frame mounted above such anvil or bed, and a series of independently-revoluble rollers carried by said frame and adapted to impart a series of blows to the dough when said frame is rotated.

10. The combination in a dough-treating machine, of means for feeding and supporting the dough, a pair of revoluble heads, a series of independently-revoluble rolls journaled in said heads and movable around a common center for the purpose of imparting a series of blows to said dough, and means for driving said heads.

11. The combination in a dough-treating machine, of a carrying-belt for the dough, an anvil over which said dough-carrying belt passes, a rotating member, and a series of independently-rotatable elements carried by said member for pressing the dough against said anvil, the latter being hollowed for the passage of the pressing means.

In testimony whereof I have signed my name to this specification in the presence of two subscribing witnesses.

PEMBROKE D. HARTON.

Witnesses:
MURRAY C. BOYER,
WM. E. SHUPE.